United States Patent
Lin et al.

(10) Patent No.: US 10,429,232 B2
(45) Date of Patent: Oct. 1, 2019

(54) SYSTEM FOR PORTABLE MEASUREMENT OF WEIGHT OF FOODSTUFFS ELECTRONIC DEVICE USING THE SYSTEM, AND ELECTRONIC DEVICE ASSEMBLY USING THE SYSTEM

(71) Applicant: Chiun Mai Communication Systems, Inc., New Taipei (TW)

(72) Inventors: Yen-Hui Lin, New Taipei (TW); How-Wen Chien, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 106 days.

(21) Appl. No.: 15/489,748

(22) Filed: Apr. 18, 2017

(65) Prior Publication Data

US 2017/0307434 A1  Oct. 26, 2017

(30) Foreign Application Priority Data

Apr. 22, 2016  (CN) .......................... 2016 1 0253065

(51) Int. Cl.

| G01G 19/414 | (2006.01) |
|---|---|
| G01G 19/62 | (2006.01) |
| G01G 3/147 | (2006.01) |
| G01G 19/52 | (2006.01) |
| G08B 5/36 | (2006.01) |
| G08B 21/18 | (2006.01) |

(52) U.S. Cl.
CPC .............. *G01G 19/62* (2013.01); *G01G 3/147* (2013.01); *G01G 19/414* (2013.01); *G01G 19/52* (2013.01); *G08B 5/36* (2013.01); *G08B 21/182* (2013.01)

(58) Field of Classification Search
CPC .... G01G 7/00–06; G01G 19/52; G01G 21/28; G01G 3/147; G01G 19/414; G01G 21/182; G01G 23/36; G08B 21/182; G08B 5/36

See application file for complete search history.

(56) References Cited

U.S. PATENT DOCUMENTS

| 3,266,584 A * | 8/1966 | Lee ...................... G01G 3/1404 |
|---|---|---|
| | | 177/134 |
| 3,960,013 A * | 6/1976 | Ormond ................ G01L 1/2231 |
| | | 177/211 |
| 4,273,204 A * | 6/1981 | Gillen ...................... G01G 7/06 |
| | | 177/210 C |

(Continued)

FOREIGN PATENT DOCUMENTS

| CN | 105318945 A | 2/2016 |
|---|---|---|
| TW | 370193 | 9/1999 |
| TW | 201406123 A | 2/2014 |

*Primary Examiner* — Randy W Gibson
(74) *Attorney, Agent, or Firm* — ScienBiziP, P.C.

(57) ABSTRACT

A weight measurement system includes a load-bearing member, a sensing module, a processor, and a prompting module. The load-bearing member supports an object and is made of an elastic material. The sensing module is electromagnetically coupled with the load-bearing member. The processor is electrically connected to the sensing module. The prompting module is electrically connected to the processor. The sensing module outputs a sensing signal to the processor upon detecting a deformation of the load-bearing member caused by the object. The processor processes the sensing signal and outputs a weight signal to the prompting module.

20 Claims, 6 Drawing Sheets

(56) References Cited

U.S. PATENT DOCUMENTS

| | | | | |
|---|---|---|---|---|
| 4,364,442 A * | 12/1982 | Flickinger | G01G 3/147 | 177/177 |
| 4,458,770 A * | 7/1984 | Bucci | G01G 19/44 | 177/210 C |
| 4,503,922 A * | 3/1985 | Brosh | G01G 3/14 | 177/210 EM |
| 4,679,643 A * | 7/1987 | Bove | G01G 7/06 | 177/210 C |
| 4,738,325 A * | 4/1988 | Bullivant | G01G 3/14 | 177/210 EM |
| 4,765,421 A * | 8/1988 | Newton | G01G 3/15 | 177/127 |
| 5,313,022 A * | 5/1994 | Piroozmandi | G01L 1/2231 | 177/132 |
| 5,900,592 A * | 5/1999 | Sohns | G01G 7/06 | 177/210 C |
| 6,748,810 B2 * | 6/2004 | Christensen | G01G 3/12 | 73/795 |
| 7,256,358 B2 * | 8/2007 | Kesselman | G01G 23/3721 | 177/177 |
| 9,506,106 B2 * | 11/2016 | Gough | G01G 3/141 | |
| 9,759,599 B2 * | 9/2017 | Bedetti | G01G 19/44 | |
| 2002/0047867 A1 * | 4/2002 | Mault | G06F 19/00 | 715/810 |
| 2010/0133016 A1 * | 6/2010 | Mannhart | G01G 19/52 | 177/1 |
| 2011/0242010 A1 * | 10/2011 | Chang | G01G 3/141 | |
| 2011/0297455 A1 * | 12/2011 | Chen | G01G 19/52 | 177/1 |
| 2014/0020961 A1 | 1/2014 | Luo et al. | | |
| 2015/0168365 A1 * | 6/2015 | Connor | G01N 33/02 | 356/51 |
| 2016/0260352 A1 * | 9/2016 | Ortiz | G09B 19/0092 | |
| 2016/0363475 A1 * | 12/2016 | Bedetti | G01G 19/44 | |
| 2018/0335336 A1 * | 11/2018 | Gyi | G01G 19/50 | |

* cited by examiner

SYSTEM FOR PORTABLE MEASUREMENT OF WEIGHT OF FOODSTUFFS ELECTRONIC DEVICE USING THE SYSTEM, AND ELECTRONIC DEVICE ASSEMBLY USING THE SYSTEM

CROSS-REFERENCE TO RELATED DISCLOSURES

This disclosure claims priority to Chinese Patent Application No. 201610253065.6 filed on Apr. 22, 2016, the contents of which are incorporated by reference herein.

FIELD

The subject matter herein generally relates to weight measurement, and more particularly to a weight measurement system, an electronic device and an electronic device assembly using the weight measurement system.

BACKGROUND

Various electronic scales are commercially available, providing a digital or other readout of the weight of an object placed on a pan of the scale. However, the various scales are usually too large to be easily transported. Therefore, an electronic device, such as a mobile phone, a tablet computer, or a personal digital assistant (PDA) having a function of measuring the weight of an object can be provided to overcome the limitations described.

BRIEF DESCRIPTION OF THE DRAWINGS

Many aspects of the disclosure can be better understood with reference to the following figures. The components in the figures are not necessarily drawn to scale, the emphasis instead being placed upon clearly illustrating the principles of the disclosure. Moreover, in the drawings, like reference numerals designate corresponding parts throughout several views.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to illustrate details and features of the present disclosure better.

The disclosure is illustrated by way of examples and not by way of limitation in the figures of the accompanying drawings, in which like references indicate similar elements. It should be noted that references to "an" or "one" embodiment in this disclosure are not necessarily to the same embodiment, and such references mean at least one.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

Figure 1:
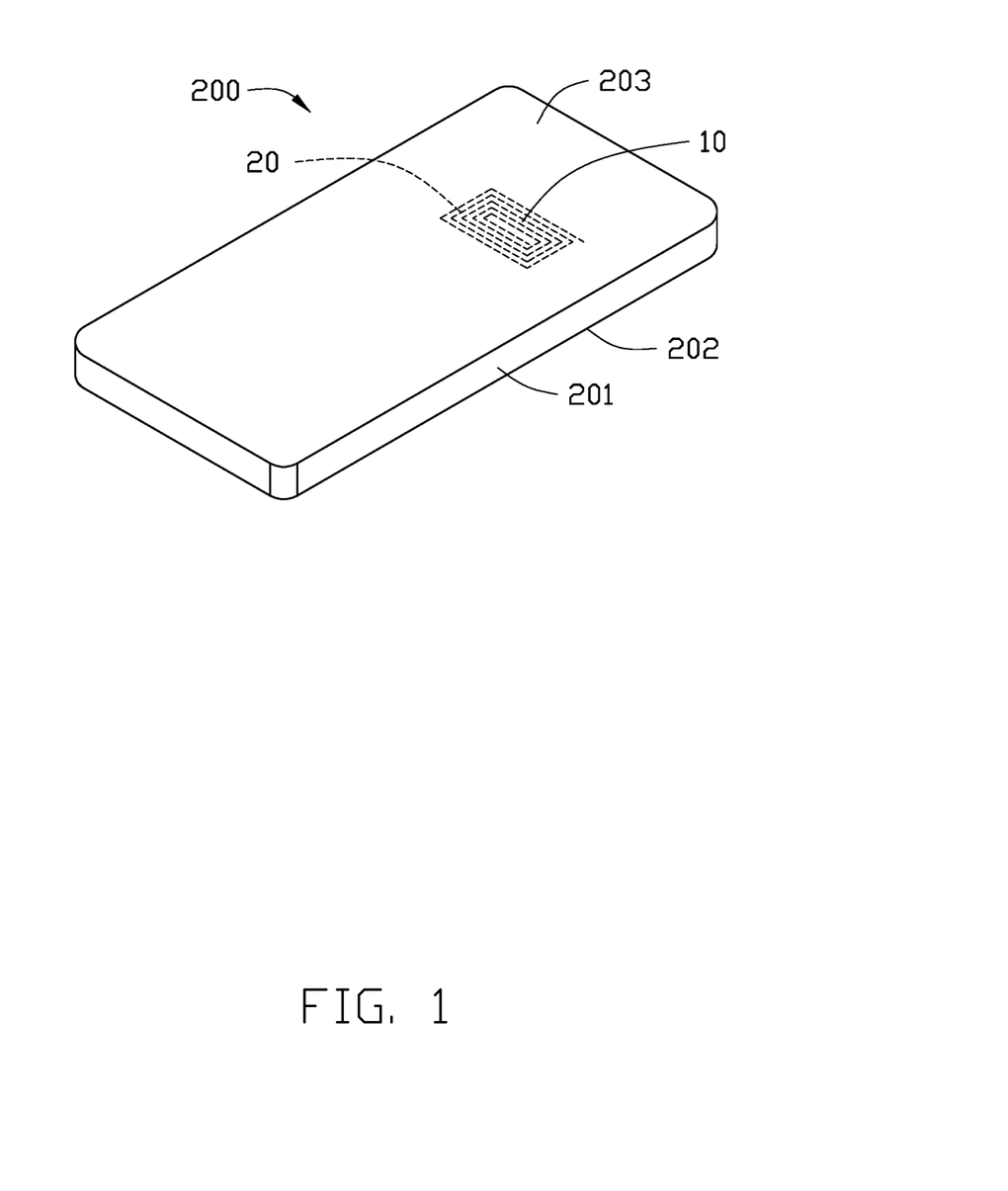
FIG. 1 is a schematic diagram of an electronic device according to an exemplary embodiment of the present disclosure.

FIG. 1 illustrates an electronic device 200. In this exemplary embodiment, the electronic device 200 can be a mobile phone, a tablet computer, or a personal digital assistant (PDA). The electronic device 200 includes a weight measurement system 100 (shown in FIG. 2) and a main body 201. The main body 201 includes a front cover 202 and a rear cover 203 facing away from the front cover 202.

Figure 2:
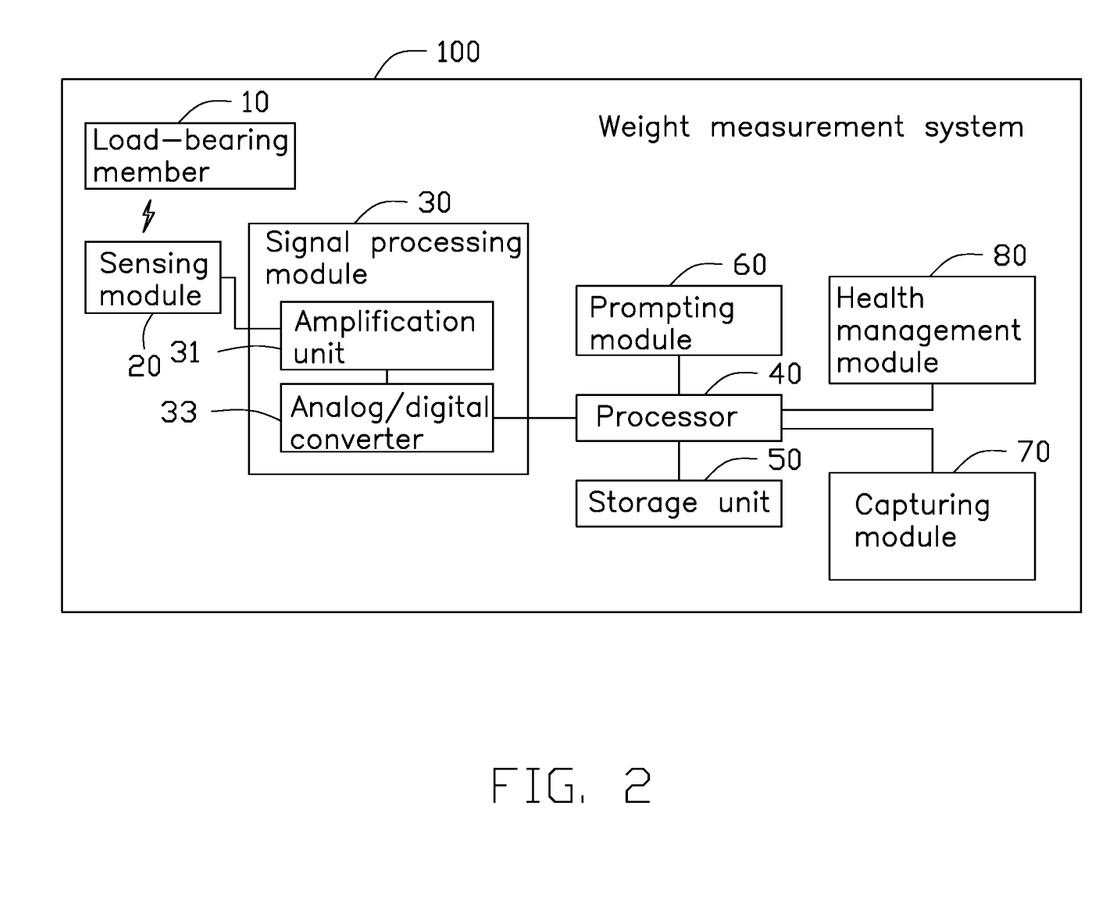
FIG. 2 is a block diagram of a weight measurement system of the electronic device of FIG. 1.

As illustrated in FIG. 2, in at least one exemplary embodiment, the system 100 includes a load-bearing member 10, a sensing module 20, a signal processing module 30, a processor 40, a storage unit 50, and a prompting module 60. The sensing module 20, the signal processing module 30, the storage unit 50, and the prompting module 60 are all electrically connected to the processor 40.

The load-bearing member 10 has a characteristic of elastic deformation. When the load-bearing member 10 is pressed, for example, when an object is placed on the load-bearing member 10, the load-bearing member 10 is deformed due to the weight of the object. The load-bearing member 10 is positioned on the rear cover 203 of the electronic device 200. In at least one exemplary embodiment, at least one portion of the rear cover 203 of the electronic device 200 forms the load-bearing member 10. The portion of the rear cover 203 forming the load-bearing member 10 is made of conductive material. In one embodiment, the conductive material is a metallic material.

The electronic device 200 further includes a printed circuit board (not shown). The sensing module 20 is positioned on the printed circuit board. The sensing module 20 can include one or more sensing coils and is spaced apart from the load-bearing member 10. The sensing module 20 is electromagnetically coupled with the load-bearing member 10. For example, the sensing module 20 is inductively coupled and/or capacitively coupled with the load-bearing member 10. When the load-bearing member 10 is deformed, the sensing module 20 senses a deformation of the load-bearing member 10 and outputs a sensing signal according to the sensed result.

In this exemplary embodiment, when the system 100 is operated, an object is placed on the load-bearing member 10. The load-bearing member 10 is pressed and deformed. Then, an inductive coupling relationship and/or a capacitive coupling relationship between the sensing module 20 and the load-bearing member 10 is changed, the sensing module 20 generates an activating voltage and outputs an analog sensing signal. The analog sensing signal is relative to a weight of the object placed on the load-bearing member 10.

The signal processing module 30 processes the analog sensing signal and outputs the processed sensing signal to the processor 40. In at least one exemplary embodiment, the signal processing module 30 includes an amplification unit 31 and an analog/digital converter 33. The amplification unit 31 is operable to amplify the analog sensing signal received from the sensing module 20 to an amplified sensing signal. The amplification unit 31 further sends the amplified sensing signal to the analog/digital converter 33. The analog/digital converter 33 is operable to transform the amplified sensing signal to a digital sensing signal. The digital sensing signal is then transmitted to the processor 40.

The processor 40 is configured to receive the digital sensing signal and calculates a voltage value indicated by the digital sensing signal. The storage unit 50 may include a hard disk drive, flash memory, RAM, ROM, cache, or external storage media. The storage unit 50 is configured to store a relationship between weight values and voltage values. The processor 40 is further configured to check whether the storage unit 50 stores the calculated voltage value. When the processor 40 determines that the calculated voltage value is stored in the storage unit 50, the processor 40 outputs a weight signal, for example, a first signal corresponding to the weight value corresponding to the calculated voltage value to the prompting module 60. In other words, the weight signal corresponds to the weight of the object. When the processor 40 determines that the calculated voltage value is not stored in the storage unit 50, which indicates that the weight of the object exceeds a predetermined maximal weight value of the system 100. That is, the object is overweight. The processor 40 then outputs the weight signal, for example, a second signal to the prompting module 60.

The prompting module 60 is configured to prompt a weight measurement state and a weight value of an object. When the object is placed on the load-bearing member 10 for weight measurement, the prompting module 60 outputs first prompting information. After the weight measurement of the object is finished, the prompting module 60 outputs a measurement result. When a weight of the object exceeds a predetermined maximal weight value of the system 100 stored in the storage unit 50, for example, the object is overweight, the prompting module 60 outputs second prompting information.

The prompting module 60 can be one or a combination of an audio player, a display unit, and a light emitting diode (LED). In at least one exemplary embodiment, the prompting module 60 is an audio player. When the prompting module 60 does not receive the weight signal (that is, the first signal or the second signal), which indicates the weight measurement is not finished, the prompting module 60 outputs the first prompting information. In this exemplary embodiment, the first prompting information is a first prompting sound, for example, a "beep" sound, for prompting the user the weight measurement is in progress. When the prompting module 60 receives the first signal from the processor 40, the prompting module 60 outputs an audio file to indicate a weight value of the object and the measurement is finished. When the prompting module 60 receives the second signal from the processor 40, the prompting module 60 outputs the second prompting information. In this exemplary embodiment, the second prompting information is a second prompting sound, for example, an "overweight" voice prompt or with three consecutive "beep beep beep" alarm sound, for prompting the user that the object is overweight.

In other exemplary embodiments, the prompting module 60 is a display unit. When the prompting module 60 does not receive the weight signal (that is, the first signal or the second signal), which indicates the weight measurement is not finished, the prompting module 60 outputs the first prompting information. In this exemplary embodiment, the first prompting information is first displayed information, for example, displaying "the weight measurement is in progress", for prompting the user the weight measurement is in progress. When the prompting module 60 receives the first signal from the processor 40, the prompting module 60 displays the weight value of the object and indicates the user that the measurement is finished. When the prompting module 60 receives the second signal from the processor 40, the prompting module 60 outputs the second prompting information. In this exemplary embodiment, the second prompting information is second display information, for example, displaying "overweight", for prompting the user that the object is overweight.

In other exemplary embodiments, the prompting module 60 is a LED. When the prompting module 60 does not receive the weight signal (that is, the first signal or the second signal), which indicates the weight measurement is not finished, the prompting module 60 outputs the first prompting information. In this exemplary embodiment, the first prompting information is first flash information, for example, the prompting module 60 keeps being turned on for a predetermined time, for prompting the user the weight measurement is in progress. When the prompting module 60 receives the first signal from the processor 40, the prompting module 60 displays the weight value of the object and indicates the user that the weight measurement is finished. When the prompting module 60 receives the second signal from the processor 40, the prompting module 60 outputs the second prompting information. In this exemplary embodiment, the second prompting information is second flash information, for example, the LED flashes for prompting the user that the object is overweight.

As illustrated in FIG. 2, in other exemplary embodiments, the system 100 further includes a capturing module 70 and a health management module 80. The capturing module 70 is electrically connected to the processor 40. The capturing module 70 is configured to detect a type of the object. The capturing module 70 captures the object and sends the captured image to the processor 40. Then the processor 40 can obtain the type of the object according to the captured image from the capturing module 70.

In at least one exemplary embodiment, the type of the object can also be obtained by inputting from the user.

The health management module 80 can be software programs installed in the electronic device 200. The health management module 80 is electrically connected to the prompting module 60. The health management module 80 records the measurement result, calculates and outputs nutrients or calories of the object combined with a type of the object to the prompting module 60. The health management module 80 is further configured to record a time of weight measurement. Combined with nutrients or calories of the object in each measurement, the health management module 80 further monitors and analyses a diet of the user and gives advises on the diet.

Figure 3:
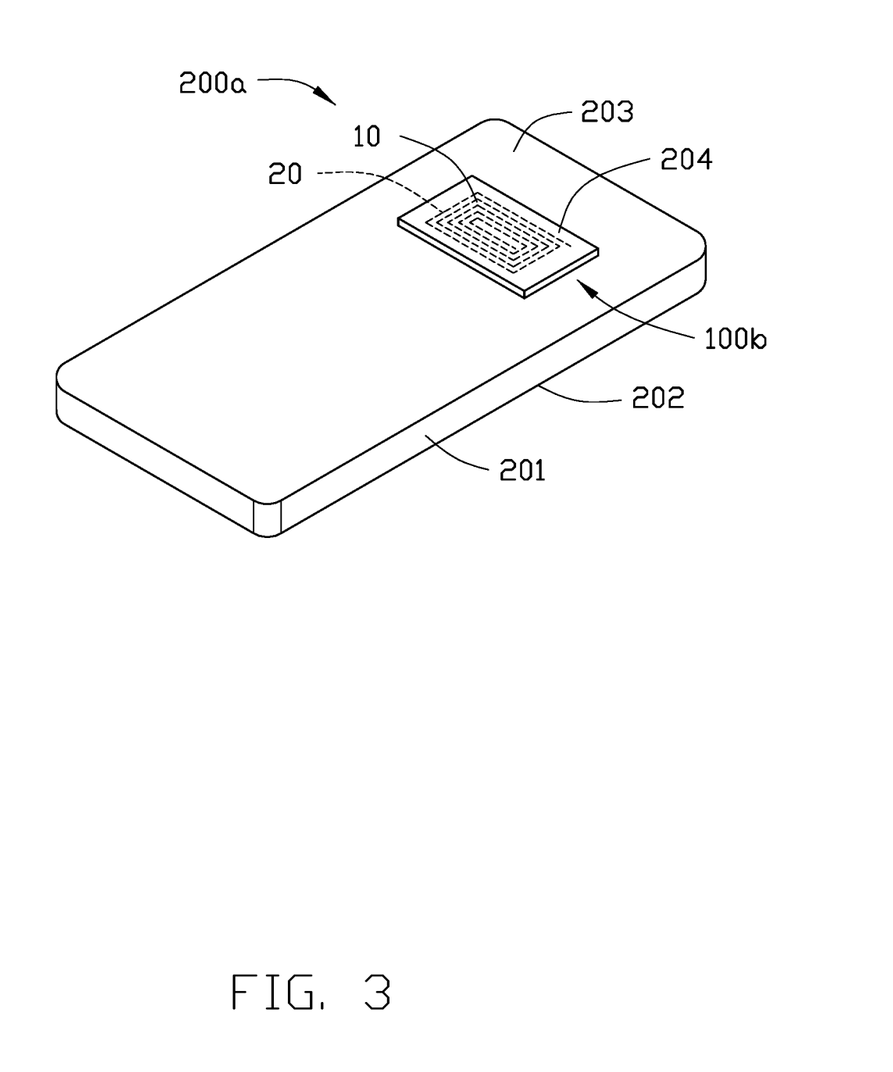
FIG. 3 is a schematic diagram of an electronic device according to an exemplary embodiment of the present disclosure.

FIG. 3 illustrates a second exemplary embodiment of a system 100b applied to an electronic device 200a. The electronic device 200a includes a main body 201. The main body 201 includes a front cover 202 and a rear cover 203 facing away from the front cover 202. The electronic device 200a differs from the electronic device 200 in that the rear cover 203 includes a protruding portion 204. The load-bearing member 10 of the system 100b is positioned on the protruding portion 204. The protruding portion 204 is made of conductive material. In at least one exemplary embodiment, the conductive material is a metallic material. The protruding portion 204 is substantially rectangular and can be deformed.

When the electronic device 200a is used for weight measurement, the protruding portion 204 is positioned on a horizontal plane, and the object is placed on a display unit positioned on the front cover 202 of the electronic device 200a. Once the object is placed on the front cover 202, the protruding portion 204 is pressed to be deformed. Then, an inductive coupling relationship and/or a capacitive coupling relationship between the sensing module 20 and the load-bearing member 10 is changed. The sensing module 20 generates an activating voltage and outputs an analog sensing signal. The analog sensing signal is relative to a weight of the object placed on the load-bearing member 10.

Figure 4:
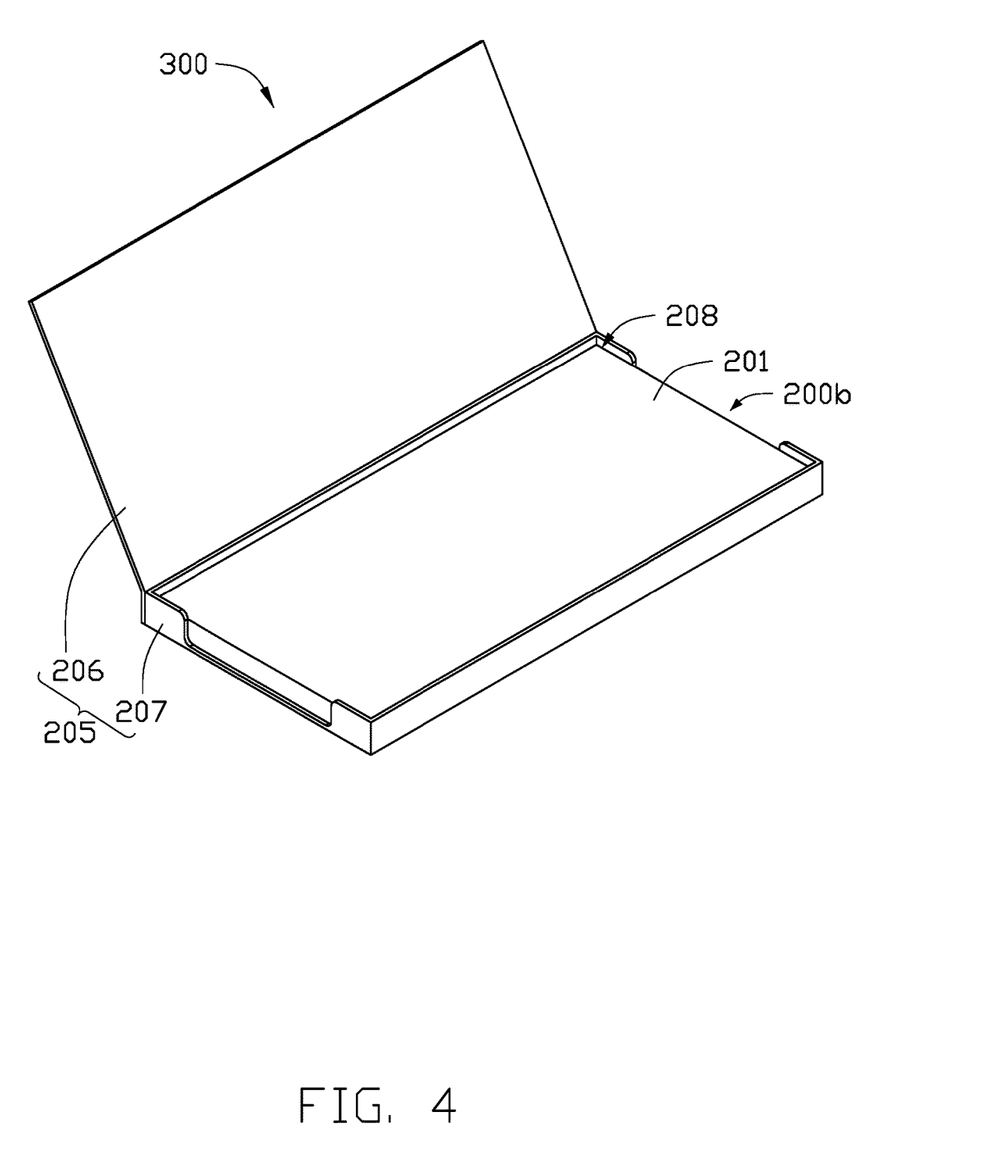
FIG. 4 is a schematic diagram of an electronic device according to an exemplary embodiment of the present disclosure.
Figure 5:
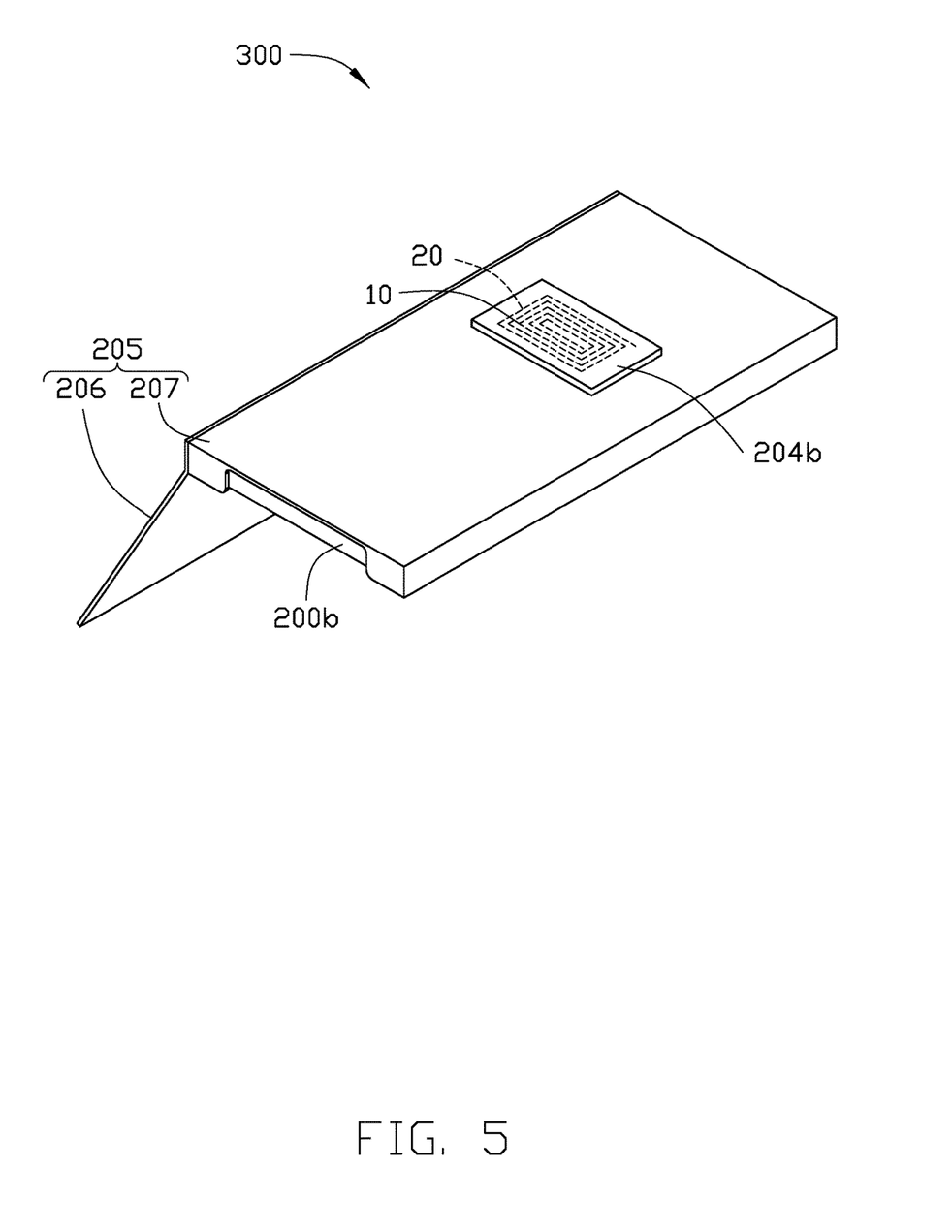
FIG. 5 is similar to FIG. 4, but showing at another angle.
Figure 6:
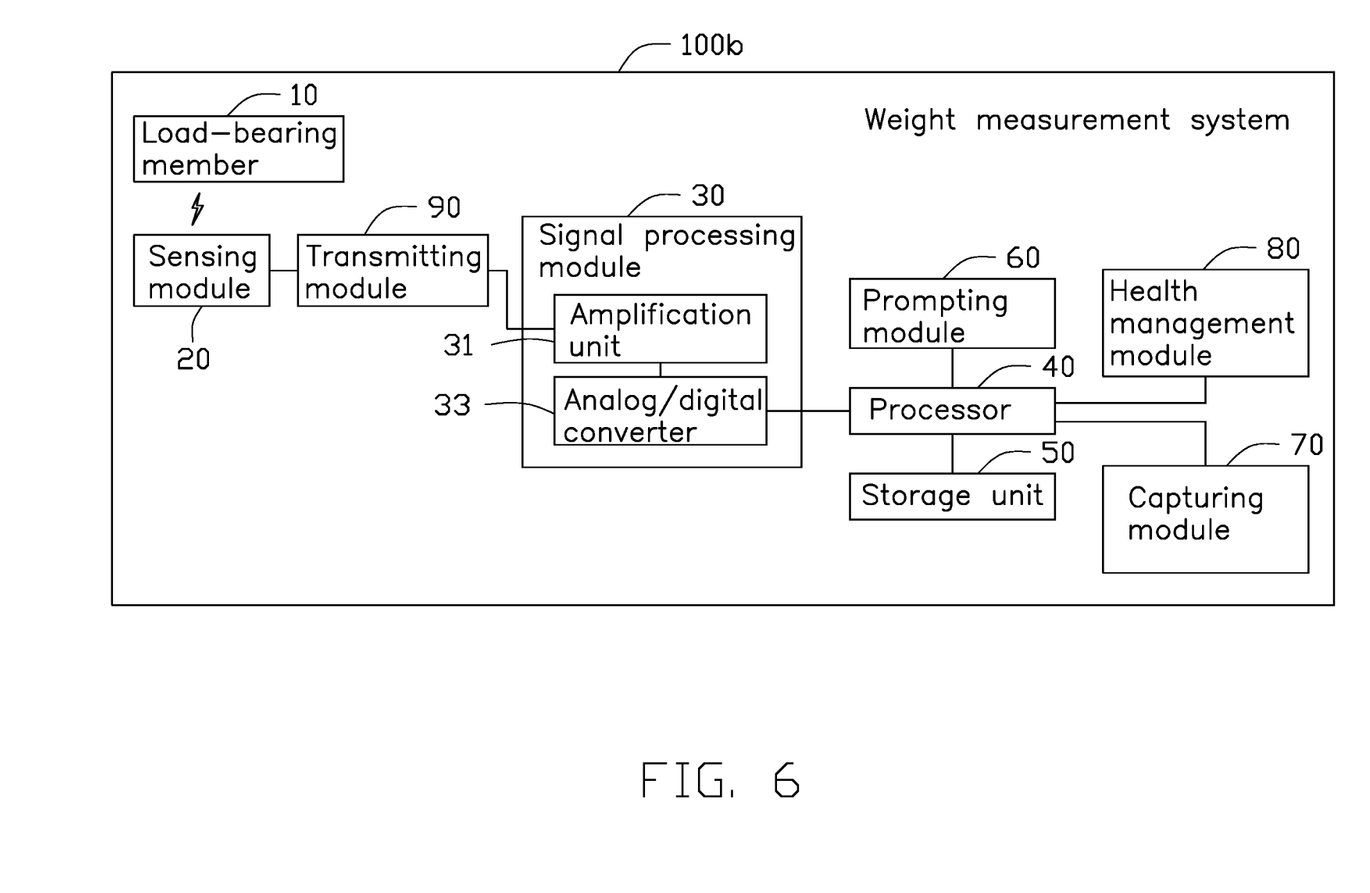
FIG. 6 is a block diagram of a weight measurement system of the electronic device of FIG. 4.

FIG. 4 to FIG. 6 illustrate a third exemplary embodiment of a system 100b applied to an electronic device 200b. The electronic device 200b differs from the electronic device 200a that the electronic device 200b further includes an accessory member 205. The electronic device 200b and the accessory member 205 cooperatively form an electronic device assembly 300. The load-bearing member 10 and the sensing module 20 of the system 100b are both positioned on the accessory member 205. The signal processing module 30, the processor 40, the prompting module 60, and the health management module 80 of the system 100b are all positioned at the electronic device 200b.

In this exemplary embodiment, the system 100b further includes a power unit (not shown) and a transmitting module 90. The power unit is positioned inside the accessory member 205. The accessory member 205 is a protecting housing and includes a first housing 206 and a second housing 207. The first housing 206 is rotatably connected to the second housing 207. The second housing 207 defines a receiving portion 208. The electronic device 200b is received in the receiving portion 208. A surface of the second housing 207 away from the first housing 206 includes a protruding portion 204b. The load-bearing member 10 is positioned on the protruding portion 204b. The object can be placed on the first housing 206 or the front cover 202 of the electronic device 200b received in the accessory member 205.

The sensing module 20 is positioned at an interior of the second housing 207 of the accessory member 205 and spaced apart from the protruding portion 204b. The power unit is configured to provide power to the transmitting module 90. In at least one exemplary embodiment, the power unit can be a detachable thin alkaline battery or a wireless charger electrically connected to the electronic device 200b. The transmitting module 90 is electrically connected to the electronic device 200b through a USB cable or other wired method. The transmitting module 90 sends the sensing signal to the processor 40.

In other exemplary embodiments, the transmitting module 90 can be connected to the electronic device 200b through wireless method, for example, Bluetooth or WIFI.

When the electronic device 200b is used for weight measurement, the object is placed on the first housing 206 or the front cover 202 of the electronic device 200b received in the accessory member 205. The protruding portion 204b is pressed to be deformed. Then, an inductive coupling relationship and/or a capacitive coupling relationship between the sensing module 20 and the load-bearing member 10 is changed. The sensing module 20 generates an activating voltage and outputs an analog sensing signal. The analog sensing signal is relative to a weight of the object placed on the load-bearing member 10.

It is believed that the embodiments and their advantages will be understood from the foregoing description, and it will be apparent that various changes may be made thereto without departing from the scope of the disclosure or sacrificing all of its advantages, the examples hereinbefore described merely being illustrative embodiments of the disclosure.

What is claimed is:

1. A weight measurement system comprising:
   a load-bearing member, configured to support an object, the load-bearing member comprising an elastic region made of an elastic material;
   a sensing module electromagnetically coupled with the load-bearing member;
   a processor electrically connected to the sensing module; and
   a prompting module electrically connected to the processor;
   wherein the sensing module is configured to detect a deformation of the elastic region of the load-bearing member and output a sensing signal to the processor upon detecting a deformation of the elastic region of the load-bearing member caused by the object, the processor processes the sensing signal and outputs a weight signal to the prompting module.

2. The weight measurement system of claim 1, further comprising a capturing module and a health management module, wherein:
   the capturing module is electrically connected to the processor, the capturing module is configured to detect a type of the object;
   the health management module is electrically connected to the prompting module, the health management module records the measurement, and calculates and outputs nutrients or calories of the object combined with a type of the object to the prompting module;
   the health management module is further configured to record a time of weight measurement, monitor and analyze a diet of the user and give advice on the diet combined with nutrients or calories of the object in each measurement.

3. The weight measurement system of claim 2, wherein the prompting module is one or a combination of an audio player, a display unit, and a light emitting diode (LED).

4. The weight measurement system of claim 3, wherein the prompting module is configured to output first prompting information when a weight measurement of the object is in progress, output a measurement result when the weight measurement is finished, and output second prompting information when the object is overweight.

5. The weight measurement system of claim 4, wherein the first prompting information is one of a first prompting sound, first displayed information, and first flash information; the second prompting information is one of a second prompting sound, second displayed information, and second flash information.

6. The weight measurement system of claim 2, wherein the load-bearing member is made of conductive material.

7. The weight measurement system of claim 6, wherein the load-bearing member is made of metallic material.

8. The weight measurement system of claim 2, wherein the sensing module comprises one or more sensing coils and is spaced apart from the load-bearing member.

9. The weight measurement system of claim 8, wherein the sensing module is inductively coupled and/or capacitively coupled with the load-bearing member; when the load-bearing member is deformed, an inductive coupling relationship and/or a capacitive coupling relationship between the sensing module and the load-bearing member is changed, and the sensing module generates an activating voltage and outputs the sensing signal.

10. The weight measurement system of claim 9, wherein the processor receives the sensing signal, calculates a voltage value indicated by the sensing signal, and outputs the weight signal corresponding to a weight of the object according to the voltage value.

11. An electronic device comprising:
  a main body including a front cover and a rear cover facing away from the front cover;
  a display unit positioned on the front cover; and
  a weight measurement system, the weight measurement system comprising:
    a load-bearing member being a part of the rear cover of the main body, the load-bearing member configured to support an object, the load-bearing member comprising an elastic region made of an elastic material;
    a sensing module positioned in an interior of the main body and electromagnetically coupled with the load-bearing member;
    a processor electrically connected to the sensing module; and
    a prompting module electrically connected to the processor;
    wherein the sensing module is configured to detect a deformation of the elastic region of the load-bearing member and output a sensing signal to the processor upon detecting a deformation of the elastic region of the load-bearing member caused by the object, the processor processes the sensing signal and outputs a weight signal to the prompting module.

12. The electronic device of claim 11, wherein the weight measurement system further comprises a capturing module and a health management module, wherein:
  the capturing module is electrically connected to the processor, the capturing module is configured to detect a type of the object;
  the health management module is electrically connected to the prompting module, the health management module records the measurement, and calculates and outputs nutrients or calories of the object combined with a type of the object to the prompting module;
  the health management module is further configured to record a time of weight measurement, monitor and analyze a diet of the user and give advice on the diet combined with nutrients or calories of the object in each measurement.

13. The electronic device of claim 12, wherein the prompting module is one or a combination of an audio player, a display unit, and a light emitting diode (LED), the prompting module is configured to output first prompting information when a weight measurement of the object is in progress, output a measurement result when the weight measurement of the object is finished, and output second prompting information when the object is overweight.

14. The electronic device of claim 13, wherein the first prompting information is one of a first prompting sound, first displayed information, and first flash information; the second prompting information is one of a second prompting sound, second displayed information, and second flash information.

15. The electronic device of claim 12, wherein the load-bearing member is made of conductive material.

16. The electronic device of claim 15, wherein the load-bearing member is made of metallic material.

17. The electronic device of claim 12, wherein the sensing module comprises one or more sensing coils and is spaced apart from the load-bearing member.

18. The electronic device of claim 17, wherein the sensing module is inductively coupled and/or capacitively coupled with the load-bearing member, when the load-bearing member is deformed, an inductive coupling relationship and/or a capacitive coupling relationship between the sensing module and the load-bearing member is changed, and the sensing module generates an activating voltage and outputs the sensing signal.

19. The electronic device of claim 18, wherein the processor receives the sensing signal, calculates a voltage value indicated by the sensing signal, and outputs the weight signal corresponding to a weight of the object according to the voltage value.

20. An electronic device assembly comprising:
  an electronic device;
  an accessory member configured to accommodate the electronic device, the accessory member comprising a transmitting module; and
  a weight measurement system, the weight measurement system comprising:
    a load-bearing member, positioned inside the accessory member, the load-bearing member configured to support an object and made of an elastic material;
    a sensing module, positioned inside the accessory member and electromagnetically coupled with the load-bearing member;
    a processor electrically connected to the sensing module; and
    a prompting module electrically connected to the processor;
  wherein the processor and the prompting module are positioned inside the electronic device, the sensing module senses a deformation of the load-bearing member and outputs a sensing signal to the transmitting module; the transmitting module sends the sensing signal to the processor, and the processor processes the sensing signal and outputs a weight signal to the prompting module.

* * * * *